United States Patent
Vyas et al.

(10) Patent No.: US 8,761,066 B2
(45) Date of Patent: Jun. 24, 2014

(54) REDUCING POWER CONSUMPTION IN A DEVICE OPERATING AS AN ACCESS POINT OF A WIRELESS LOCAL AREA NETWORK

(75) Inventors: Pankaj Vyas, Bangalore (IN); Venu Madhava Rao Kosuri, Bangalore (IN); Vishal Batra, Bangalore (IN)

(73) Assignee: Gainspan Corporation, San Jose, CA (US)

( * ) Notice: Subject to any disclaimer, the term of this patent is extended or adjusted under 35 U.S.C. 154(b) by 109 days.

(21) Appl. No.: 13/462,851

(22) Filed: May 3, 2012

(65) Prior Publication Data

US 2013/0294303 A1    Nov. 7, 2013

(51) Int. Cl.
*H04W 4/00* (2009.01)

(52) U.S. Cl.
USPC ........................................................ 370/311

(58) Field of Classification Search
USPC ............. 370/311, 338, 474; 455/343.1–343.6
See application file for complete search history.

(56) References Cited

U.S. PATENT DOCUMENTS

| | | |
|---|---|---|
| 8,023,444 B2 | 9/2011 | Bowser et al. |
| 2011/0158115 A1 | 6/2011 | Sun et al. |
| 2012/0155353 A1* | 6/2012 | Ohlenbusch et al. ......... 370/311 |

OTHER PUBLICATIONS

"Ashima Gupta and Prasant Mohapatra" "Power Consumption and Conservation in WiFi Based Phones: A Measurement-Based Study" Downloaded dated May 31, 2011, pp. 1-10.
"Xavier Perez-Costa , Daniel Camps-Mur and Albert Vidal" "On the Distributed Power Saving Mechanisms ofWireless LANs 802.11e U-APSD vs 802.11 Power Save Mode", NEC Network Laboratories, Germany, Dated: Nov. 1, 2006, pp. 1-17.
"Wi-Fl Alliance" "WMM™ Power Save for Mobile and Portable Wi-Fi® Certified Devices" Copyright dated: Dec. 2005, pp. 1-16.
"802.11 MAC (Media Access Control)" "ZyTrax, Inc." Copyright dated: 1994-2012, pp. 1-3.

* cited by examiner

*Primary Examiner* — Abdullah Riyami
*Assistant Examiner* — Brian Cox
(74) *Attorney, Agent, or Firm* — Narendra Reddy Thappeta

(57) ABSTRACT

An access point communicates with a wireless station based on a point-to-point channel, to determine time instances of future communication to be received from the wireless station. In intervals between such future communications, the access point powers down at least some portions of a circuit contained within the access point for at least a partial duration between such future communications. In an embodiment, the powered-down portions include the receiver portions of the access point. The access point may be battery-powered, and the powering-down of the receiver portions enables reduction of power consumption in the access point.

14 Claims, 5 Drawing Sheets

REDUCING POWER CONSUMPTION IN A DEVICE OPERATING AS AN ACCESS POINT OF A WIRELESS LOCAL AREA NETWORK

RELATED APPLICATION

The present invention is related to application Ser. No. 13/462,852, entitled, "PROVIDING CONNECTIVITY TO END DEVICES USING WIRELESS LOCAL AREA NETWORK TECHNOLOGIES", naming as inventors: Pankaj Vyas and Vishal Batra, filed on even date herewith, and is incorporated into the subject patent application in its entirety.

BACKGROUND OF THE INVENTION

1. Technical Field

Embodiments of the present disclosure relate generally to wireless networks, and more specifically to reducing power consumption in an access point of a wireless network.

2. Related Art

A wireless local area network (WLAN) generally refers to a wireless network, which facilitates multiple devices to communicate with each other over a wireless medium. The devices communicate with each other according to corresponding standards/protocols defined for the WLAN. An example of such protocols/standards is defined in the IEEE 802.11 family of standards.

A WLAN typically contains wireless stations and access points. Wireless stations refer to end devices, which send/receive packets for communication with other wireless stations and/or other devices external to the WLAN. Access points on the other hand refer to devices that are generally intended for receiving and forwarding/switching packets from/to the wireless stations and/or devices external to the WLAN.

Operation as an access point (AP) entails at least some of features such as forwarding/switching noted above, sending periodic beacons (so that the wireless stations can associate with the access point for sending/receiving packets), and in general, to communicate using packet formats designed for operation as an access point. As is well-known in the relevant arts, an AP is an entity that has station functionality and provides access to distribution services (DS) via a wireless medium (WM) for associated wireless stations (clients).

There is a general need to reduce power consumption in such access points of a WLAN.

BRIEF DESCRIPTION OF THE VIEWS OF DRAWINGS

Example embodiments of the present invention will be described with reference to the accompanying drawings briefly described below.

The drawing in which an element first appears is indicated by the leftmost digit(s) in the corresponding reference number.

DETAILED DESCRIPTION

1. Overview

An access point (AP) communicates with a wireless station based on a point-to-point channel, to determine at a first time instance, a future time instance at or after which a subsequent communication is expected to be received from the wireless station at the access point. The AP receives the subsequent communication at a second time instance. The second time instance is at or after the future time instance. The AP powers-down at least a portion of a circuit contained in the access point in at least a partial duration between the first time instance and the future time instance, to thereby reduce power consumption in the access point.

According to another aspect of the present invention, such future time instance is determined based on communication with an application executing on a wireless station. In an embodiment, a peer application implemented at the access point provides data indicating the future time instance at which the wireless station may transmit messages to the access point. The application executing on the access point accordingly causes the circuit portion to be powered down between the first time instance and the future time instance.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
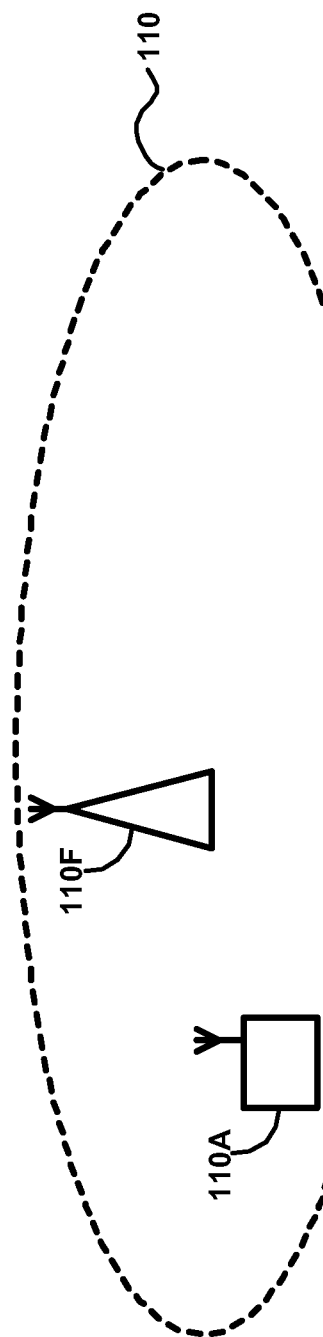
FIG. 1 is a block diagram of an example environment in which several features of the present invention can be implemented.

FIG. 1 is a block diagram of an example environment in which several features of the present invention can be implemented. FIG. 1 is shown containing access point (AP) 110F and wireless station 110A. In an embodiment of the present invention, AP 110F, and wireless station (stations) 110A are designed to operate according to IEEE 802.11 family of standards, and form an infrastructure basic service set (infrastructure BSS) 110.

AP 110F may be, for example, an embedded device containing (or attached to) devices such as, for example, sensors (for obtaining physical parameter values such as temperature, pressure, blood glucose level, etc), actuators, etc. In an embodiment, AP 110F is a human-wearable tag for monitoring blood pressure of the person wearing the tag. Thus, AP 110F may not be implemented with a user interface such as display, user input devices, etc. In the embodiment, wireless station 110A is a mobile phone implemented with wireless station functionality according to IEEE 802.11, and is used for receiving and displaying the blood pressure values recorded by AP 110F. Station 110A may also send commands 110F for setting the rate at which blood pressure measurements are to be taken and transmitted to station 110A. Each of AP 110F and station 110A may be battery-powered devices.

In a packet transmitted by AP 110F to station 110A, the "FromDS" field in the 802.11 header indicates that the packet is flowing from the AP 110F to station 110A. In a packet transmitted by station 110A to AP 110F, the "ToDS" field in the 802.11 header indicates that the packet is flowing from station 110A to AP 110F.

It should be appreciated that wireless stations may communicate with other wireless devices in a peer-to-peer manner (e.g., independent BSS in 802.11 standard) or via an access point (as in an infrastructure BSS in 802.11 standard of FIG. 1). The inventors observed that more devices such as mobile phones are already implemented to operate in conjunction with access points in an infrastructure BSS mode, compared to peer-to-peer manner of independent BSS mode. By operating as an access point, AP 110F may interoperate with a broader deployed base of wireless stations.

At least when AP 110F is implemented as a battery-powered device it may be desirable to reduce power consumption in AP 110F. The manner in which reduction of power consumption is achieved in AP 110F is described next.

3. Reducing Power Consumption in an AP of a WLAN

Figure 2:
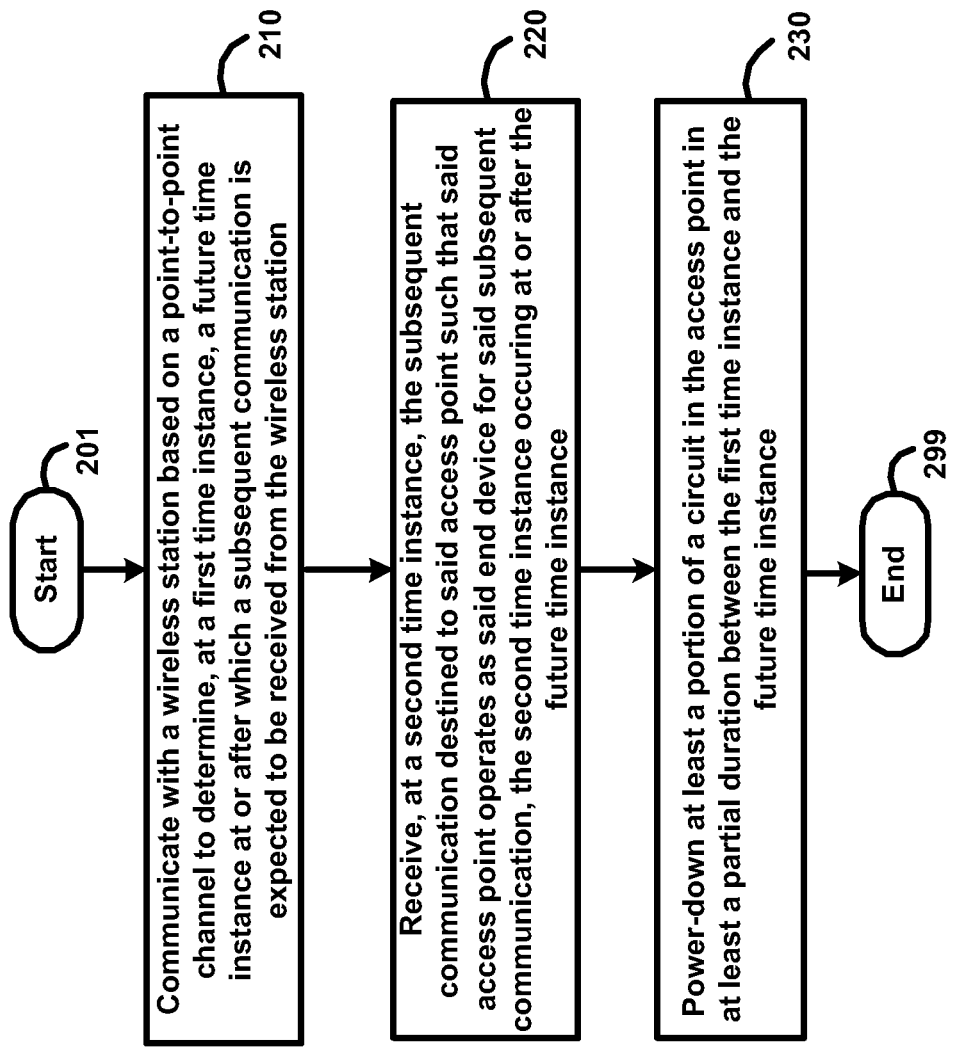
FIG. 2 is a flowchart illustrating the manner in which power consumption is reduced in an access point operating as an end device, in an embodiment of the present invention.

FIG. 2 is a flowchart illustrating the manner in which power consumption is reduced in an AP operating as an end device, in an embodiment of the present invention. The flowchart is described with respect to the environment of FIG. 1 merely for illustration. However, various features described herein can be implemented in other environments and using other components as will be apparent to one skilled in the relevant arts by reading the disclosure provided herein.

Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, AP 110F communicates with wireless station 110A on a point-to-point channel, to determine, at a first time instance, a future time instance at or after which a subsequent communication is expected to be received from station 110A. The 'point-to-point channel' means that the communication from AP 110F is not a broadcast message, but is directed to (i.e., has the address of) wireless station 110A as the destination address. The communication may be initiated by an application executing on AP 110F. Control then passes to step 220.

In step 220, AP 110F receives, at a second time instance, the 'subsequent communication' (noted in step 210). The subsequent message may be directed to AP 110F, (i.e., the subsequent message may have AP 110F as the destination. The second time instance coincides with or is later than the future time instance. Control then passes to step 230.

In step 230, AP 110F powers-down at least a portion of a circuit contained in AP 110F in at least a partial duration between the first time instance and the future time instance. Control then passes to step 299, in which the flowchart ends.

Thus, AP 110F has prior knowledge of future transmission windows of station 110A. Such prior knowledge is made possible either by design or by negotiation between (corresponding applications in) AP 110F and station 110A. In the example in which AP 110F is a wearable tag used to record blood pressure, station 110A may need to transmit to AP 110F only the rate (i.e., number of measurements per unit time) at which blood pressure is recorded and transmitted to station 110A, which may need to be done only infrequently. An application executing in AP 110F causes AP 110F to request station 110A to transmit such rate commands only at predefined intervals decided by AP 110F. As a result, AP 110F 'knows' the future time instances (or intervals) in which station 110A will transmit packets to AP 110F. AP 110F may power-down one or more circuit portions in durations between such future time intervals, thereby reducing power consumption.

In an embodiment, the circuit portions that are powered-down (step 230) are the receiver circuitry of AP 110F. Since AP 110F knows the transmission intervals of station 110A, AP 110F powers-down the receiver portions. The receiver portions may include baseband receive-processing circuit portions as well as RF (radio frequency) and IF (intermediate frequency) circuit portions of the receive chain. 'Powering-down' may either be in the form of complete removal of power supply from one or more of the corresponding receiver portions, or alternatively operation of the corresponding portions at a reduced speed using a lower-frequency clock.

Figure 5:
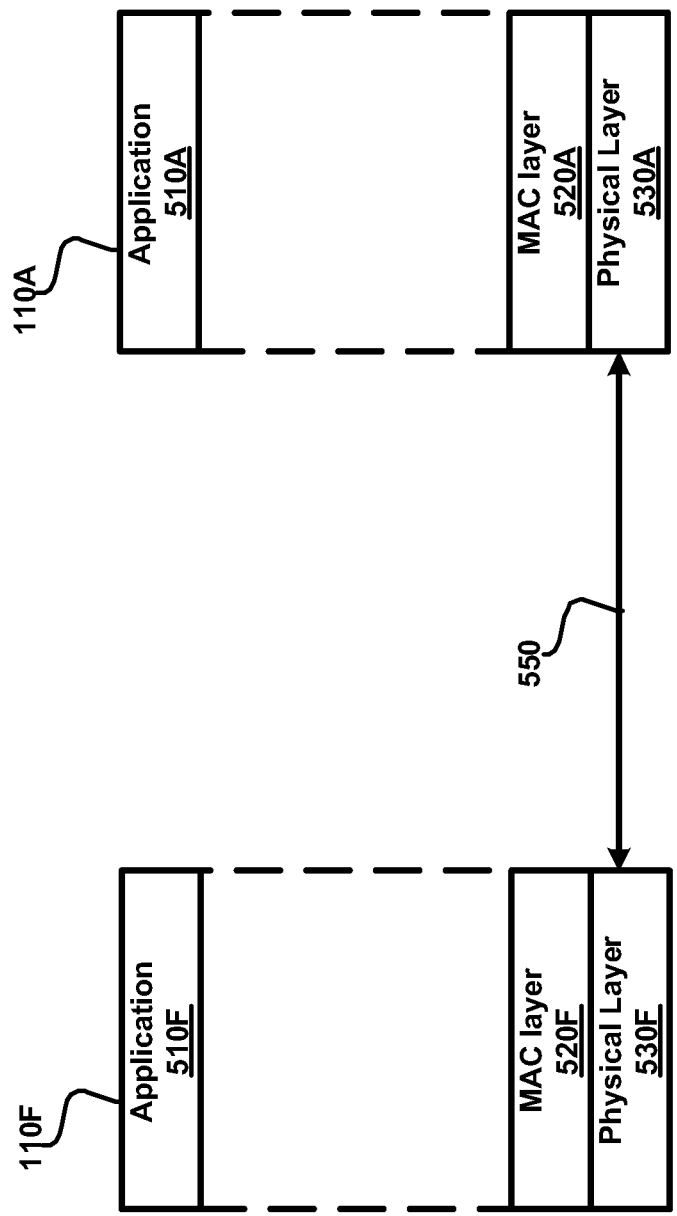
FIG. 5 is a diagram illustrating relevant protocol-stack-level details of an access point and a wireless station, in an embodiment of the present invention.

FIG. 5 is a diagram illustrating relevant protocol-stack-level details of AP 110F and station 110A. AP 110F is shown containing physical layer 530F, MAC (medium access control) layer 520F and application 510F. Station 110A is shown containing physical layer 530A, MAC layer 520A and application 510A.

As is well known in the relevant arts, physical layer 530F and MAC layer 520F of AP 110F perform the corresponding physical layer and MAC layer operations of AP 110F according to the OSI (open systems interconnect) model. Similarly, physical layer 530A and MAC layer 520A of station 110A perform the corresponding physical layer and MAC layer operations of station 110A. MAC layer 520F and MAC layer 520A may be implemented by corresponding software modules executing on AP 110A and station 110A respectively.

Each of AP 110F and station 110A may additionally contain other intermediate layers, but are not shown in FIG. 5. It should be appreciated that any such layers, including the software modules that drive the operation of MAC layer 520F and physical layer 530F, which provide communication capability to applications, may be together termed as a communication module. Path 550 represents a wireless path on which AP 110F and station 110A communicate with each other.

Application 510F represents an application executing in AP 110F. Similarly, application 510A represents an application executing in station 110A, and is a peer-application to application 510F. Though only a single application is shown executing on each of access point 110F and wireless station 110A for conciseness, it should be appreciated that many more applications can be executing on each of the devices, and communication module can provide communication capability to each of such applications, in a known way.

The steps of the flowchart of FIG. 2 are performed by application 510F. In the example noted above, application 510F obtains blood pressure measurements from a sensor in AP 110F, and transmits the measurements (by appropriate transactions with MAC layer 520F and physical layer 530F) to station 110A. Application 510A obtains the transmitted measurements via corresponding transactions with MAC layer 520A and physical layer 530A, and may display the measurements on a display contained in station 110A. In addition, application 510F sends a request to application 510A to transmit measurement rate updates only at predefined intervals decided by AP 110F. Thus, the flow of transmissions from station 110A are 'controlled' by application 510F, which commands the corresponding receive circuits in AP 110F to be powered-down in time intervals when transmissions from station 110A are not scheduled.

Figure 3:
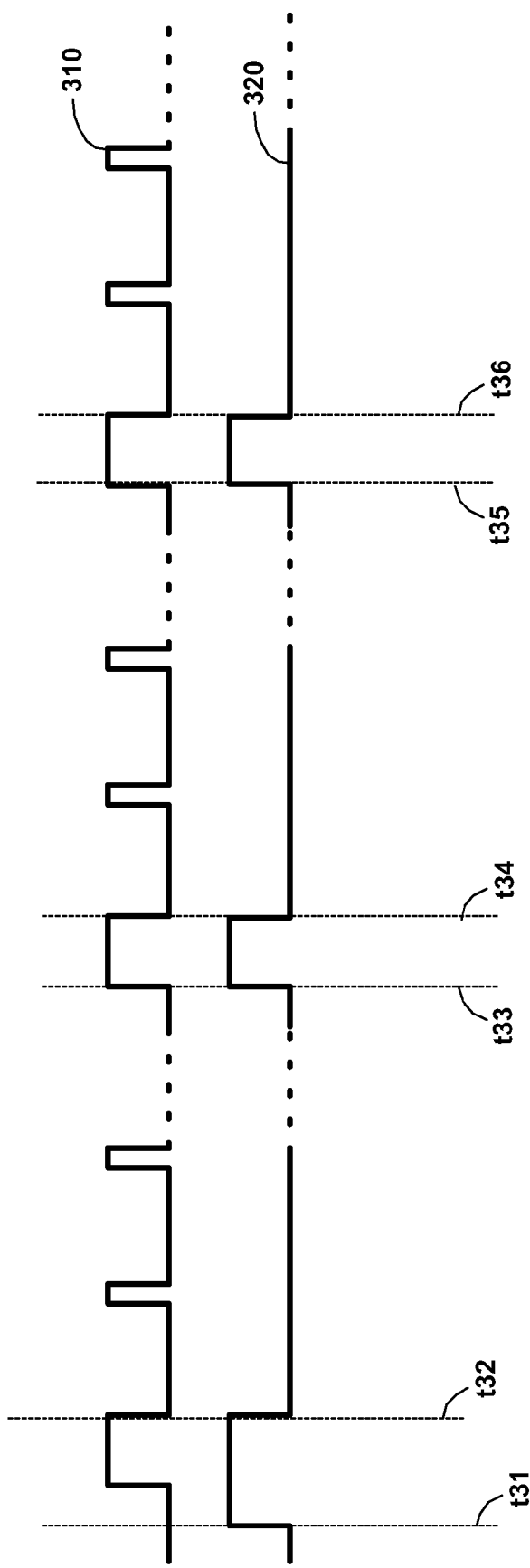
FIG. 3 is an example timing diagram illustrating the powering-down of the receive chain in an access point operating as an end device.

FIG. 3 is an example timing diagram illustrating the power-down durations of (one or more portions of) the receive chain of AP 110F. Logic high durations of waveform 310 represent transmissions (to station 110A) of AP 110F. The transmission may include both beacon transmissions as well as data transmission intended for station 110A. Logic high durations of waveform 320 represent intervals in which the receive chain of AP 110F is powered-ON, the logic low durations representing intervals in which the receive chain is powered-down. In FIG. 3, it is assumed that station 110A associates with AP 110F sometime during the interval t31-t32. In interval t31-t32, AP 110F maintains the receive-chain in a power-ON mode. Once association is complete, AP 110F may request (sometime in interval t31-t32) station 110A to send rate commands only at specific time intervals (for example, once every hour). Such request from AP 110F to station 110A is sent as a point-to-point message, i.e., as a message specifically addressed to station 110A, and thus contains the address (e.g., MAC address and/or IP address) of station 110A as the destination address. AP 110F receives from station 110A, in interval t31-t32, an initial rate at which blood pressure measurements are to be taken and transmitted to station 110A.

AP 110F powers-down the receive chain at t32, but continues to send beacon transmissions as well as blood pressure readings to station 110A, as indicated by the corresponding logic high portions of waveform 310. AP 110F expects to receive a rate command from station 110A at (or after, but not earlier than) t33. Accordingly, AP 110F powers-ON it's receive chain at t33 (or slightly earlier than t33 to provide for power-ON transients). AP 110F may receive an updated rate command from station 110A sometime in interval t33-t34, and may change the earlier rate setting received in interval t31-t32. In FIG. 3, it is assumed that the rate command received in interval t33-t34 does not alter the previous rate setting. It is noted that in power-down intervals of the receive chain (e.g., t32-t33), AP 110F does not block the wireless channel from any transmissions occurring, i.e., does not prevent station 110A (or other wireless stations, if they exist) from transmitting on the wireless medium during such power-down intervals.

After reception of transmissions from station 110A in interval t33-t34, AP 110F again powers-down one or more portions of the receive chain till the next expected transmission that may need to be received from station 110A in interval t35-t36. AP 110F may, thus, power-ON the receive chain only for pre-arranged intervals in which transmissions destined for AP 110F from station 110A occur, thereby saving power.

It is noted that when wireless stations other than station 110A are present, the powering-down of the receiver chain of AP 110F may potentially result in AP 110F missing connection requests from stations other than station 110A. Such degraded operation may be acceptable in the environment of FIG. 1. The implementation details of AP 110F in an embodiment are described next.

4. Access Point

Figure 4:
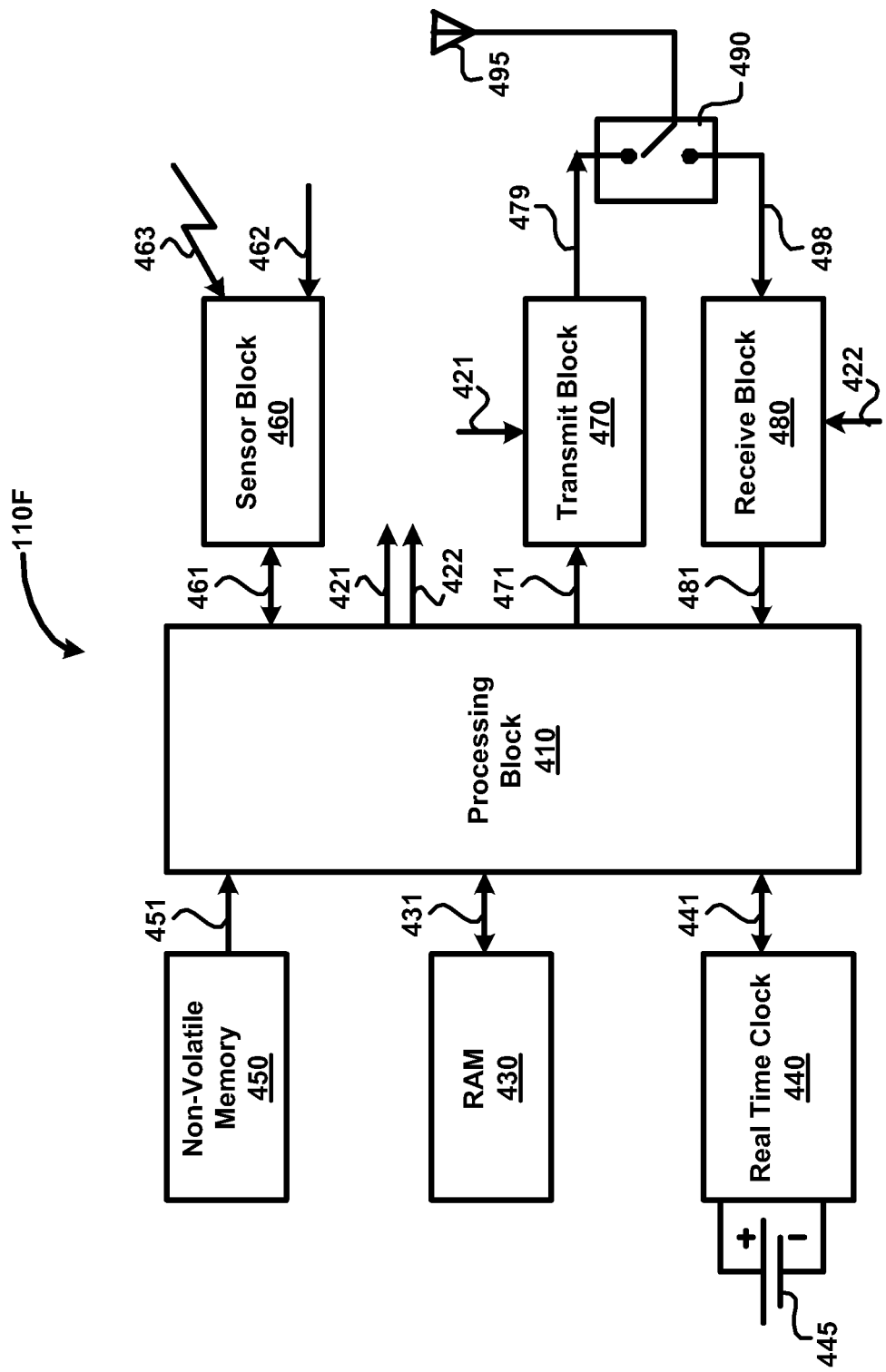
FIG. 4 is a block diagram illustrating the implementation details of an access point in an embodiment of the present invention.

FIG. 4 is a block diagram illustrating the implementation details of an access point in an embodiment of the present invention. AP 110F is shown containing processing block 410, volatile memory (RAM) 430, real-time clock (RTC) 440, battery 445, non-volatile memory 450, sensor block 460, transmit block 470, receive block 480, switch 490 and antenna 495. The whole of AP 110A may be implemented as a system-on-chip (SoC), except for battery 445. Alternatively, the blocks of FIG. 4 may be implemented on separate integrated circuits (IC).

The components/blocks of AP 110A are shown merely by way of illustration. However, AP 110A may contain more or fewer components/blocks. Further, all blocks/components of AP 110F are powered by battery 445, although only RTC 440 is shown in FIG. 4 as being powered by battery 445.

Sensor block 460 may contain one or more sensors, as well as corresponding signal conditioning circuitry, and provides on path 461 measurements/values of physical quantities such as temperature, pressure, etc., sensed via wired path 462 or wireless path 463. In an embodiment, sensor block 460 is a blood pressure sensor. It should be appreciated that data is created (contrasted to mere forwarding of data received from other wireless devices) representing such measured values due to the operation of sensor block 460.

Antenna 495 operates to receive from, and transmit to, a wireless medium corresponding wireless signals containing data. Switch 490 may be controlled by processing block 410 (connection not shown) to connect antenna 495 either to receive block 480 via path 498, or to transmit block 470 via path 479, depending on whether AP 110A is to receive or transmit. In another embodiment, the receive and transmit blocks each are connected to separate antennas to enable simultaneous reception and transmission.

Transmit block 470 receives data (to be transmitted via antenna 495) on path 471 from processing block 410, generates a modulated radio frequency (RF) signal according to IEEE 802.11 standards, and transmits the RF signal via switch 490 and antenna 495. Receive block 480 receives an RF signal bearing data via switch 490 and antenna 495, demodulates the RF signal, and provides the extracted data to processing block 410 on path 481. Receive block 480 represents the receive chain of AP 110F, and may include corresponding RF, IF and baseband processing portions.

RTC 440 operates as a clock, and provides the 'current' time to processing block 410 on path 441. RTC 440 may also contain memory to store critical information received from processing block 410.

Non-volatile memory 450 stores instructions, which when executed by processing block 410, causes AP 110F to provide several desired features noted herein. For example, when AP 110F is implemented as a wearable tag to record (and transmit) blood pressure measurements, processing block 410 may process and transmit measurement blood pressure readings obtained from sensor block 460. In addition, the instructions may be designed to enable AP 110F to operate consistent with the description provided. Thus, non-volatile memory 450 contains instructions and data to enable processing block 410 to power-down receive block 480 in a manner described above with respect to the flowchart of FIG. 2.

In addition to power-down-control of the receive chain, the instructions may be designed to enable processing block 410 to power-down transmit block 470 as well (for example between beacon transmissions). In Figure, processing block 410, in response to corresponding commands from application 510F, controls the power-down/power-up control of receive block 480 and transmit block 470 via control signals 422 and 421 respectively.

RAM 430 may be used to store data and temporary variables to be processed by processing block 410 in providing desired features. In particular, instructions and data representing the software modules and variables for enabling AP 110F to provide power-down features as described above may be copied by processing block 410 from non-volatile memory 450 to RAM 430 for execution.

Volatile memory 430 and non-volatile memory 450 constitute computer program products or machine/computer readable medium, which are means for providing instructions to processing block 410. Processing block 410 may contain multiple processing units internally, with each processing unit potentially being designed for a specific task. Alternatively, processing block 410 may contain only a single general-purpose processing unit. The instructions executed by processing block 410 enable AP 110F to perform the steps of the flowchart of FIG. 2.

Thus, when operating as a blood pressure sensor, AP 110F may be able to communicate with a large number of mobile phones, which are implemented in conjunction with access points. Such communication can be the basis for implementation of various management applications on mobile phone type devices. In the example embodiment described herein, the blood pressure at various time instances can be measured using sensor 460 and sent to a mobile phone for display or further transmission via cellular networks, etc.

5. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method performed in an access point (AP) of a Wireless Local Area Network (WLAN), said method comprising:
communicating by a local application executing on said access point, with a peer application executing on a wireless station based on a point-to-point channel to determine at a first time instance, a future time instance at or after which a subsequent communication is expected to be received from said wireless station at said access point;
receiving at a second time instance said subsequent communication destined to said access point, wherein said second time instance is at or after said future time instance;
powering down, by said local application, at least a portion of a circuit contained in said access point in at least a partial duration between said first time instance and said future time instance, to thereby reduce power consumption in said access point;
creating a data value in said access point;
receiving, by said local application, said data value; and
transmitting, by said local application, said data value to said wireless station in a duration in which said portion of said circuit is powered on,
wherein said local application communicates with said peer application using a communication module provided in said access point, said communication module being enabled to provide communication capabilities according to protocols defined for said WLAN, for applications executing in said access point;
wherein said creating creates a plurality of data values including said data value,
wherein said subsequent communication specifies a rate at which said access point is to transmit said plurality of data values to said wireless station,
wherein said local application communicates with said peer application to determine said future time instance at or after which update to said rate is expected to be received from said wireless station,
wherein said transmitting transmits said plurality of data values according to a new value received for said rate at or after said future time instance,
wherein said portion of said circuit comprises a receive block of said access point such that said receive block is powered down in at least said partial duration.

2. The method of claim 1, wherein said wireless station is a mobile phone and said access point is a monitoring/controlling device.

3. The method of claim 1, wherein said access point is a blood pressure measuring device and each of said plurality of data values represents a corresponding magnitude of blood pressure measured on a person wearing said access point.

4. The method of claim 1, wherein said protocols defined for said WLAN are according to 802.11 standard, and said communication module comprises physical layer and MAC layer such that said local application is provided on top of said MAC layer.

5. The method of claim 4, wherein said wireless station and said access point are part of an infrastructure basic service set (BSS),
wherein none of the wireless stations, including said wireless station, of said BSS are blocked by said access point from transmitting on the wireless medium of said WLAN in said partial duration.

6. A non-transitory computer readable medium storing one or more sequences of instructions for causing an access point to communicate with a wireless station, said access point and said wireless station being part of a Wireless Local Area Network (WLAN), said one or more sequences of instructions comprising:
a first set of instructions constituting a communication module, said communication module upon execution in said access point being designed to provide communication capability according to protocols defined for said WLAN, for applications executing in said access point;
a second set of instructions constituting an application module, wherein execution of said application module provides a local application executing in said access point, wherein said local application performs the actions of:
communicating, based on said communication capability provided by said communication module, with a peer application executing on said wireless station to determine at a first time instance, a future time instance at or after which a subsequent communication is expected to be received from said wireless station at said access point;
receiving at a second time instance said subsequent communication destined to said access point, wherein said second time instance is at or after said future time instance;
powering down at least a portion of a circuit contained in said access point in at least a partial duration between said first time instance and said future time instance, to thereby reduce power consumption in said access point;

receiving a data value, wherein said data value is created in said access point; and transmitting said data value to said wireless station in a duration in which said portion of said circuit is powered on, wherein said access point creates a plurality of data values including said data value, wherein said subsequent communication specifies a rate at which said access point is to transmit said plurality of data values to said wireless station, wherein said local application communicates with said peer application to determine said future time instance at or after which update to said rate is expected to be received from said wireless station, wherein said transmitting transmits said plurality of data values according to a new value received for said rate at or after said future time instance, wherein said portion of said circuit comprises a receive block of said access point such that said receive block is powered down in at least said partial duration.

7. The non-transitory computer readable medium of claim 6, wherein said access point is a blood pressure measuring device and each of said plurality of data values represents a corresponding magnitude of blood pressure measured on a person wearing said access point.

8. The non-transitory computer readable medium of claim 6, wherein said protocols defined for said WLAN are according to 802.11 standard, and said communication module comprises physical layer and MAC layer such that said local application is provided on top of said MAC layer.

9. The non-transitory computer readable medium of claim 8, wherein said wireless station and said access point are part of an infrastructure basic service set (BSS), wherein none of the wireless stations, including said wireless station, of said BSS are blocked by said access point from transmitting on the wireless medium of said WLAN in said partial duration.

10. An access point (AP) of a Wireless Local Area Network (WLAN), said AP comprising:

a memory to store instructions;

a processor to retrieve instructions from said memory and to execute said instructions, wherein execution of said retrieved instructions provides a local application in said AP, said local application being enabled to perform the actions of:

communicating by said local application executing on said access point, with a peer application executing on a wireless station based on a point-to-point channel to determine at a first time instance, a future time instance at or after which a subsequent communication is expected to be received from said wireless station at said access point;

receiving at a second time instance said subsequent communication destined to said access point, wherein said second time instance is at or after said future time instance;

powering down, by said local application, at least a portion of a circuit contained in said access point in at least a partial duration between said first time instance and said future time instance, to thereby reduce power consumption in said access point;

receiving a data value, wherein said data value is created in said access point; and transmitting said data value to said wireless station in a duration in which said portion of said circuit is powered on, wherein said local application communicates with said peer application using a communication module provided in said access point, said communication module being enabled to provide communication capabilities according to protocols defined for said WLAN, for applications executing in said access point;

wherein said AP creates a plurality of data values including said data value, wherein said subsequent communication specifies a rate at which said access point is to transmit said plurality of data values to said wireless station, wherein said local application communicates with said peer application to determine said future time instance at or after which update to said rate is expected to be received from said wireless station, wherein said transmitting transmits said plurality of data values according to a new value received for said rate at or after said future time instance, wherein said portion of said circuit comprises a receive block of said access point such that said receive block is powered down in at least said partial duration.

11. The AP of claim 10, wherein said wireless station is a mobile phone and said access point is a monitoring/controlling device.

12. The AP of claim 10, wherein said access point is a blood pressure measuring device and each of said plurality of data value represents a corresponding magnitude of blood pressure measured on a person wearing said access point.

13. The AP of claim 10, wherein said protocols defined for said WLAN are according to 802.11 standard, and said communication module comprises physical layer and MAC layer such that said local application is provided on top of said MAC layer.

14. The AP of claim 13, wherein said wireless station and said access point are part of an infrastructure basic service set (BSS), wherein none of the wireless stations, including said wireless station, of said BSS are blocked by said access point from transmitting on the wireless medium of said WLAN in said partial duration.

* * * * *